US009680659B2

(12) United States Patent
Uchida et al.

(10) Patent No.: US 9,680,659 B2
(45) Date of Patent: Jun. 13, 2017

(54) OBTAINING, MANAGING AND ARCHIVING CONFERENCE DATA

(75) Inventors: Yuki Uchida, Lincoln Park, NJ (US); Shun Tanaka, Wes New York, NJ (US)

(73) Assignee: RICOH COMPANY, LTD., Tokyo (JP)

( * ) Notice: Subject to any disclaimer, the term of this patent is extended or adjusted under 35 U.S.C. 154(b) by 80 days.

(21) Appl. No.: 13/595,885

(22) Filed: Aug. 27, 2012

(65) Prior Publication Data

US 2014/0059010 A1 Feb. 27, 2014

(51) Int. Cl.
*G06F 17/30* (2006.01)
*H04L 12/18* (2006.01)
*H04N 7/15* (2006.01)
*H04L 29/06* (2006.01)

(52) U.S. Cl.
CPC ...... *H04L 12/1831* (2013.01); *H04L 65/1089* (2013.01); *H04L 65/403* (2013.01); *H04L 65/4038* (2013.01); *H04N 7/155* (2013.01)

(58) Field of Classification Search
CPC .............. G06F 17/30; G06F 17/30038; G06F 17/30705; G06Q 50/16; G06Q 50/18
USPC ........................................................ 707/661
See application file for complete search history.

(56) References Cited

U.S. PATENT DOCUMENTS

| | | | |
|---|---|---|---|
| 7,006,881 B1 * | 2/2006 | Hoffberg ................ | G05B 15/02 700/17 |
| 7,251,675 B1 * | 7/2007 | Kamakura ........... | G06Q 10/109 709/204 |
| 8,126,849 B2 * | 2/2012 | Schwan ............... | G06F 11/2094 707/655 |
| 2004/0145652 A1 * | 7/2004 | Yamauchi ................ | H04N 7/15 348/14.02 |
| 2005/0222890 A1 * | 10/2005 | Cheng .................. | G06Q 10/109 705/7.19 |
| 2008/0077869 A1 * | 3/2008 | Cho ........................ | G06Q 10/10 715/753 |
| 2009/0119246 A1 * | 5/2009 | Kansal ............... | G06F 17/30038 |
| 2010/0145678 A1 * | 6/2010 | Csomai ............... | G06F 17/2755 704/9 |
| 2010/0153410 A1 * | 6/2010 | Jin ..................... | G06F 17/30569 707/758 |
| 2010/0192072 A1 * | 7/2010 | Spataro ................. | H04L 65/403 715/753 |
| 2011/0119165 A1 * | 5/2011 | Zee ........................ | G06Q 10/02 705/30 |

(Continued)

*Primary Examiner* — Syed Hasan
*Assistant Examiner* — Ahmed Abraham
(74) *Attorney, Agent, or Firm* — Cooper & Dunham LLP

(57) ABSTRACT

Tools can be provided for conducting a conference/meeting and/or obtaining, managing and archiving conference/meeting data. For example, a meeting participation application and multi-layer presentation data (including a presentation document and an overlay layer) can be provided through a network to a participant. The meeting participation application allows the participant to make annotations which overlay the presentation document, and captures the user input as data in the overlay layer. Thereafter, processing may be performed to extract keywords from the captured annotations, and such extracted keywords can be archived along with meeting materials, documents, information and other content as meeting data in a meeting database.

12 Claims, 14 Drawing Sheets

(56) References Cited

U.S. PATENT DOCUMENTS

| | | | |
|---|---|---|---|
| 2011/0208736 A1* | 8/2011 | Fitzpatrick | G06F 17/30867 707/736 |
| 2012/0011205 A1* | 1/2012 | Paulsami | G06Q 10/1095 709/206 |
| 2012/0278738 A1* | 11/2012 | Kruse | G06Q 10/10 715/754 |
| 2012/0293545 A1* | 11/2012 | Engh-Halstvedt | G06T 15/40 345/629 |
| 2013/0145284 A1* | 6/2013 | Anantharaman | H04L 12/1822 715/753 |
| 2013/0211868 A1* | 8/2013 | DeLuca | G06Q 10/109 705/7.19 |
| 2014/0006354 A1* | 1/2014 | Parkison | G06F 17/30194 707/649 |

* cited by examiner

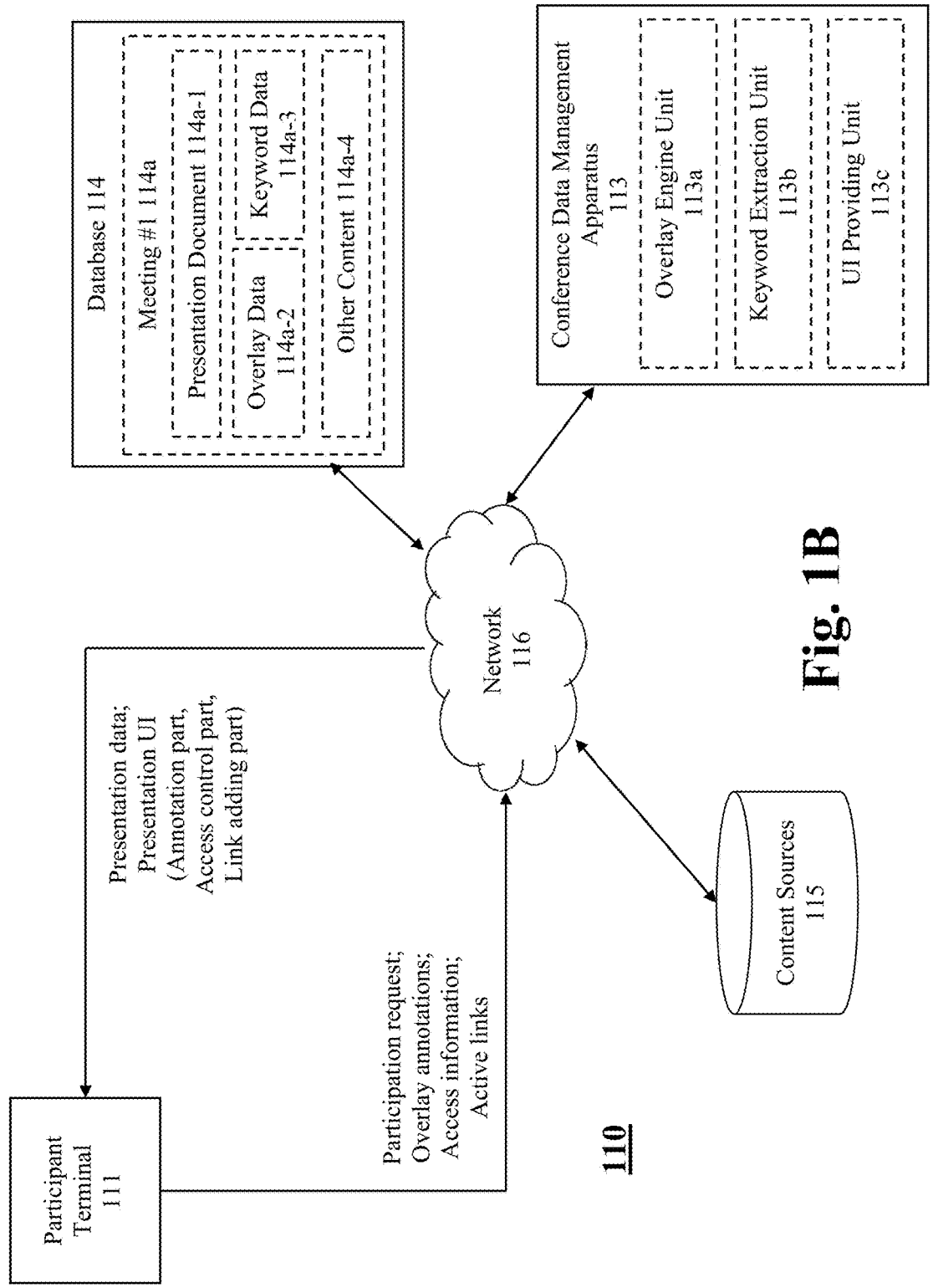

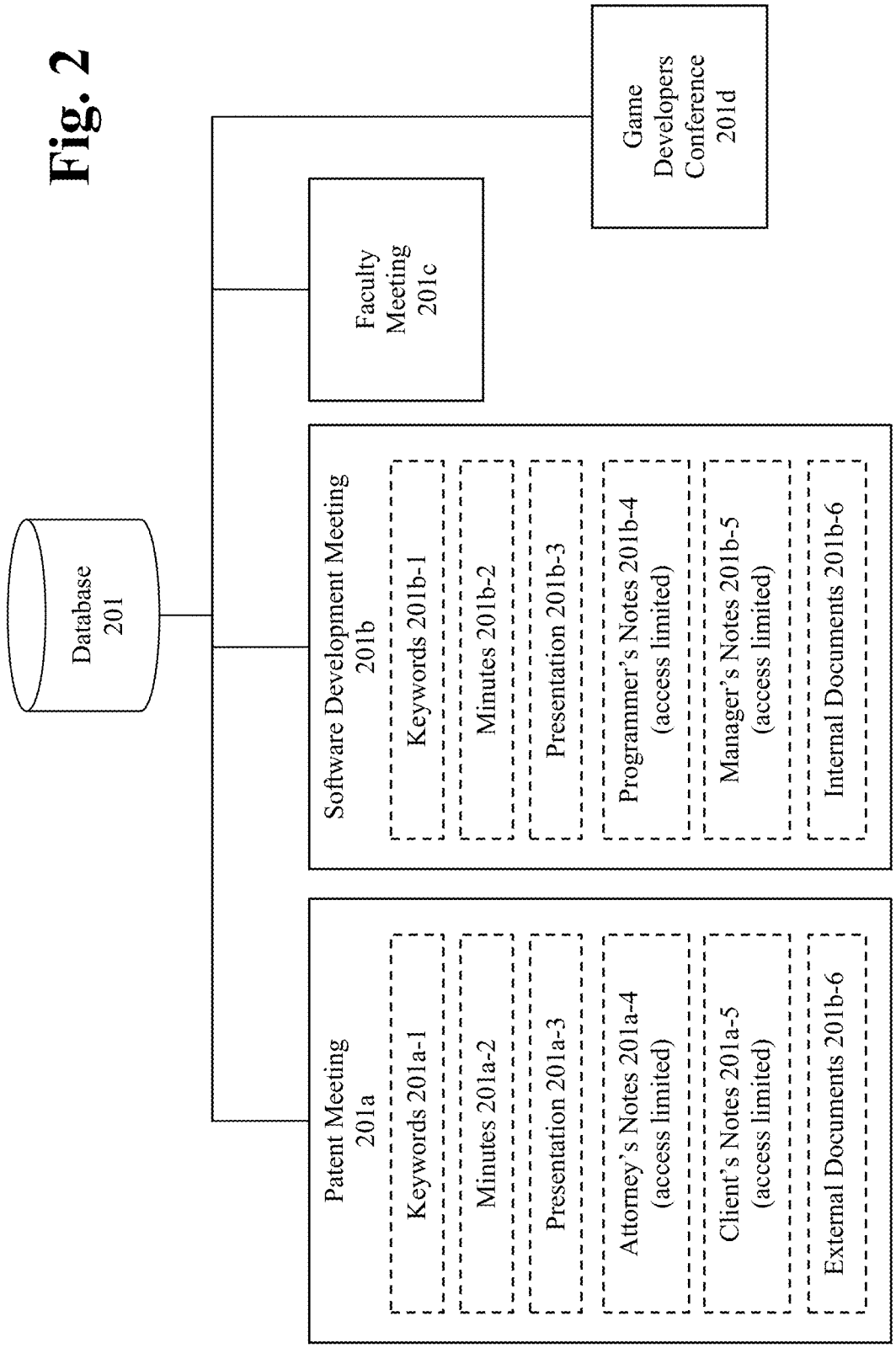

Meeting Information

| Meeting ID | Name | Date/Time |
|---|---|---|
| 1 | Meeting#1 | 04/05/2012 13:00 |
| 2 | Meeting#2 | 04/10/2012 10:00 |

Overlay Data Information

| File ID | Meeting ID | File URL |
|---|---|---|
| 1 | 1 | http://xxx/meetingA/m.pdf |
| 2 | 1 | http://xxx/meetingA/m1.pdf |
| 3 | 2 | http://xxx/meetingB/n.pdf |

Participant Information

| Participant ID | Meeting ID | Name |
|---|---|---|
| 1 | 1 | Jim |
| 2 | 1 | Tom |
| 3 | 2 | Greg |
| 4 | 2 | Helen |

Keyword Information

| Keyword ID | Meeting ID | Keyword |
|---|---|---|
| 1 | 1 | Tablet |
| 2 | 1 | OS |
| 3 | 1 | Ratio |
| 4 | 1 | Share |
| 5 | 1 | Wifi |
| 6 | 2 | Tablet |
| 7 | 2 | iPad |
| 8 | 2 | Galaxy |
| 9 | 3 | 100g |
| 10 | 3 | Firewall |
| 11 | 3 | NAT |
| 12 | 3 | Wifi |

Fig. 9

Overlay Data and Author Information

| File ID | File URL | Author ID | Author Name |
|---|---|---|---|
| 1 | http://xxx/meetingA/ol1.pdf | 1 | Adam Smith |
| 2 | http://xxx/meetingA/ol2.pdf | 2 | Michael Page |
| 3 | http://xxx/meetingA/ol3.pdf | 3 | Greg Patterson |
| 4 | http://xxx/meetingB/ol1.pdf | 1 | Adam Smith |
| 5 | http://xxx/meetingB/ol2.pdf | 4 | Christine Wolfe |

Fig. 10

Overlay Data Access Information

| File ID | File URL | Access Type |
|---|---|---|
| 1 | http://xxx/meetingA/ol1.pdf | Public |
| 2 | http://xxx/meetingA/ol2.pdf | Private |
| 3 | http://xxx/meetingA/ol3.pdf | Presenter only |
| 4 | http://xxx/meetingB/ol1.pdf | Admin only |
| 5 | http://xxx/meetingB/ol2.pdf | Same department only |

Fig. 11

Saved Content Information

| File ID | Meeting ID | Content Source Location | Saved Location | Time of Archival |
|---|---|---|---|---|
| 1 | 1 | http://xxx/docs/patent101.pdf | Z:\meeting1\content\patent101.pdf | 01-12-2012 19:11 |
| 2 | 1 | X:\sound_files\Speech_1.mp3 | Z:\meeting1\content\Speech_1.mp3 | 01-12-2012 19:11 |
| 3 | 1 | http://yyy/video1.wmv | Z:\meeting1\content\video1.wmv | 01-12-2012 19:12 |
| 4 | 2 | http://zzz/cited_art/Ref1.pdf | Z:\meeting2\content\Ref1.pdf | 03-19-2012 09:59 |
| 5 | 2 | http://zzz/cited_art/Ref2.pdf | Z:\meeting2\content\Ref2.pdf | 03-19-2012 09:59 |

Fig. 12

OBTAINING, MANAGING AND ARCHIVING CONFERENCE DATA

TECHNICAL FIELD

This disclosure relates to tools (such as, for example, systems, apparatuses, methodologies, applications, other computer programs, etc.) for conducting conferences and/or obtaining, managing and archiving conference data.

BACKGROUND

In the current digital age, the trend is that more and more tasks involve use of information technology (IT) and digital media.

For example, meetings or conferences are now often conducted virtually (e.g., through a network) and/or via mixed communication media (e.g., in person supplemented by delivery of meeting content through a network). At a meeting, when a presenter is giving a presentation to the attendees of the meeting, printed copies of the presentation slides are often made available to the attendees. The attendees of the meeting often take notes or make annotations directly onto the printed slides. With today's technology, such attendees can access the presentation slides on their mobile devices (such as a tablet, handset, etc.). In addition, other information may be exchanged and/or considered during the meeting, in addition to the presentation slides.

As an example, a presenter making the presentation may supply additional materials or information that is not in the slides, or a participant may utilize a network-connected terminal to retrieve materials or content via the network. Further, the meeting participant may take notes or make annotations via a software application, or on a hardcopy of the slides or other sheets.

However, it takes some personal discipline and self-organization by the participant to collect together all of the materials, information and content that was considered during the meeting. If such archiving is not performed at (or shortly after) the conclusion of the meeting, the materials, information or content may be lost, or at least difficult to locate, at a later time.

There is a need for tools to manage and archive such materials, information and content.

Further, there are may be instances in which the notes and annotations of participants may be of interest to others (such as the presenter, a meeting organizer, a manager, other participants, etc.), for assorted reasons. One possible way of finding out such information would be to analyze the notes and annotations, either on paper or digitally. However, such approach assumes that the participants willingly take additional steps to make the notes or annotations available, which may involve a cumbersome process.

There is a need for more convenient ways to extract information from the notes and annotations by the participants of a meeting.

SUMMARY

This disclosure provides tools (for example, systems, apparatuses, methodologies, applications, other computer programs, etc.) for conducting conferences and/or obtaining, managing and archiving conference data. Various features may be included in such tools.

For example, annotations made by meeting or conference attendees or participants (the terms "attendee" and "participant" are used interchangeably herein) are extracted and processed, meeting materials, documents and/or data are collected, compiled and maintained for the specific meeting in an organized fashion that facilitates access and retrieval, etc.

In an aspect of this disclosure, the aforementioned meeting materials, documents, information and other content are collected, compiled and archived in a meeting database. For example, archived data may include content accessed by a participant and captured from the content source at or shortly after the conclusion of the meeting. Such captured content from the content source can be associated with the time (that is, including date) of capture and may be archived along with an active link to the content source, so that content from the content source may be accessed at a later time (which later content may or may not be the same as the archived content captured at the specific capture time).

In another aspect, a meeting participation application and multi-layer presentation data are provided through a network to a participant, in response to a request from the participant terminal to participate in the meeting. The multi-layer presentation data includes the presentation document and an overlay layer. The meeting participation application allows the participant to make annotations, via any of the input devices that may be provided by the participant's terminal (such as a touchscreen user interface, graphical keyboard, hard keys, etc.), overlaying the presentation document and captures the user input as data in the overlay layer.

In the case that the participant accesses other content (such as via a network) during the meeting, the accessed content can be captured in the meeting database, and the user input to access such content can be captured as data in the overlay layer with a pointer to the content source and/or a pointer to the captured content in the meeting database.

In another aspect, the overlay data is processed through graphics and/or text to recognize keywords in the overlay data, and the recognized keywords are associated with the specific meeting and such association is captured by the meeting data in the meeting database.

The meeting data captured in the meeting database for a specific meeting can include (i) a presentation document, (ii) an overlay portion including sets of overlay data capturing annotations of the respective participants of the specific meeting, (iii) a keyword portion including keywords extracted from the overlay data, and (iv) other content.

BRIEF DESCRIPTION OF THE DRAWINGS

The aforementioned and other aspects, features and advantages can be better understood from the following detailed description with reference to the accompanying drawings wherein:

FIG. 1B shows a block diagram of a system, according to another exemplary embodiment;

FIG. 2 shows a configuration of a meeting database, according to an exemplary embodiment;

FIG. 9 shows tables stored in a meeting database in an exemplary embodiment;

FIG. 10 shows overlay data and author information, according to an exemplary embodiment;

FIG. 11 shows overlay data access information, according to an exemplary embodiment;

FIG. 12 shows saved content information, according to an exemplary embodiment.

DETAILED DESCRIPTION

In this disclosure, tools are provided for conference data management services (e.g. annotation extraction, document categorization and document archival).

In the present application, most of the discussion is done using the example of a conference. However, the embodiments of the present application are also applicable to meetings, lectures, or any other event involving a document to be presented to one or more participants.

Figure 1A:
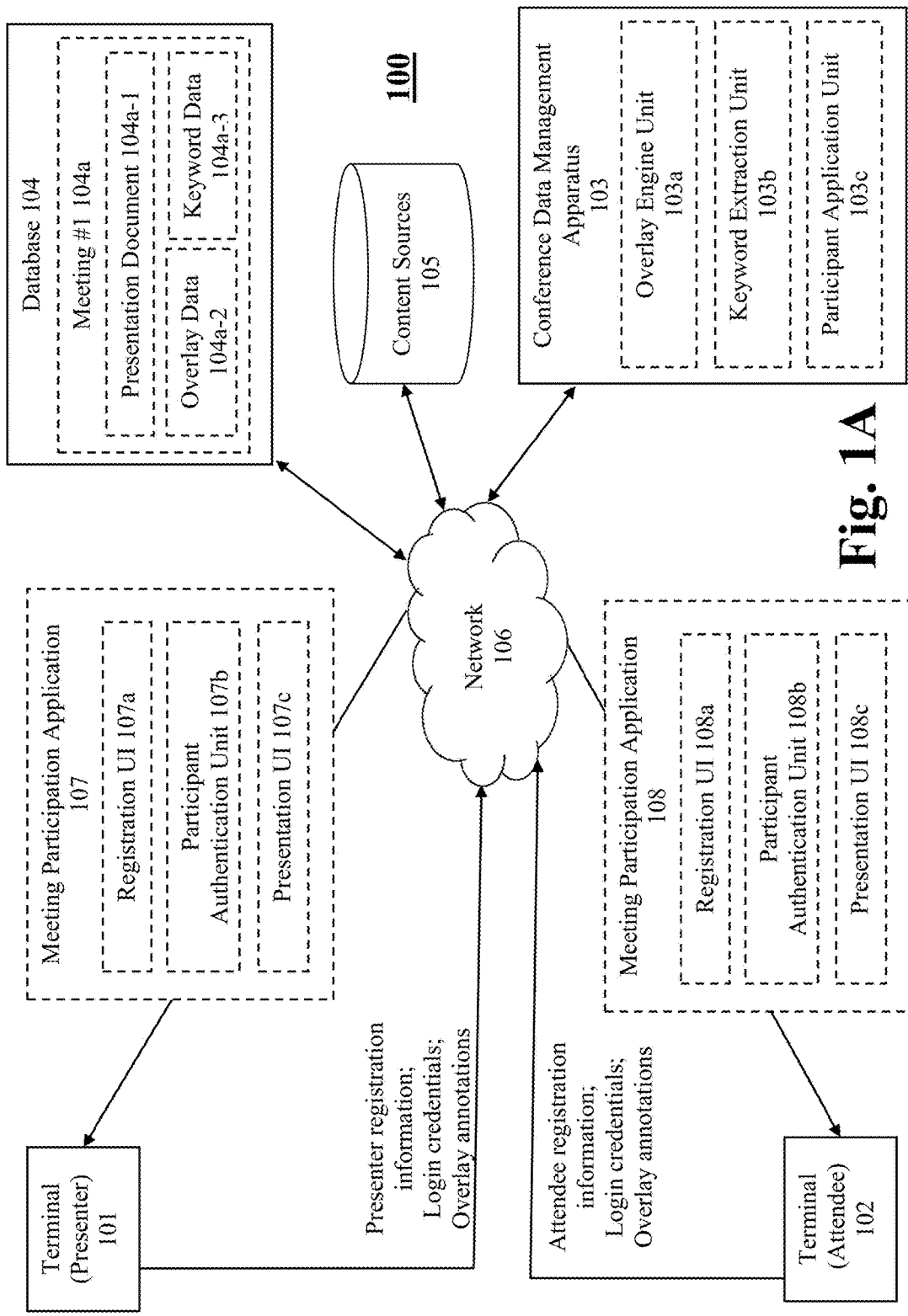
FIG. 1A shows a block diagram of a system, according to an exemplary embodiment.

Referring now to the drawings, wherein like reference numerals designate identical or corresponding parts throughout the several views, FIG. 1A shows a block diagram of a system 100, according to an exemplary embodiment of the present disclosure. The system 100 includes terminals 101 and 102, a conference data management apparatus 103, a database 104 and content sources 105, all of which are interconnected by a network 106. The conference data management apparatus 103 includes an overlay engine unit 103a, a keyword extraction unit 103b and a participant application unit 103c. The participant application unit 103c of the conference data management apparatus 103 provides, via the network 106, meeting participation applications 107 and 108 to terminals 101 and 102, respectively. The meeting participation applications 107 and 108 contain registration UIs 107a and 107b, participant authentication unit 107b and 108b, and presentation UIs 107c and 108c, respectively.

The terminal 101 represents a terminal device of a presenter at a conference (or a meeting, a lecture, etc.). The terminal 101 is used by the presenter, for example, to view the presentation file at the conference, and make overlay annotations to such presentation file. Similarly, the terminal 102 represents a terminal device used by an attendee at the conference to view the presentation files and make overlay annotations to presentation files. As illustrated in FIG. 1A, the terminals 101 and 102 are provided with the meeting participation applications 107 and 108, respectively, and the terminals 101 and 102 provide registration information, login credentials and overlay annotations to the conference data management apparatus 103 via the network 106. The registration information is utilized by the conference data management apparatus 103 to register the user of the terminals 101 and 102 (i.e. presenter or attendee) as a participant, allowing the user to access the various services provided by the conference data management apparatus 103. The login credentials are utilized by the conference data management apparatus 103 to verify that the user is authorized to participate in the conference. In addition, in a case that the user wishes to retrieve overlay annotations of another participant of the conference, the login credentials may be used to verify that the user has access to the particular overlay annotations of said another user.

The terminals 101 and 102 are preferably equipped with a touch-sensitive display wherein the presenter or the attendee can use his or her finger or other input device (stylus, etc.) to make overlay annotations to the presentation document provided by the meeting participation applications 107 and 108. Additionally, the terminals 101 and 102 may also be equipped with a physical keyboard or have a way of displaying a graphical keyboard such that the presenter or the attendee (collectively referred to as participants) include his or her notes and make additional comments on the presentation document. Such functionalities are further described infra in connection with FIG. 3.

The terminals 101 and 102 can be any computing device, including but not limited to a personal, notebook or workstation computer, a kiosk, a PDA (personal digital assistant), a mobile phone or handset, a tablet, another information terminal, etc., that can communicate with other devices through the network 106. Although only two terminals are shown in FIG. 1A, it should be understood that the system 100 can include a plurality of terminals (which can have similar or different configurations). The terminals 101 and 102 are further described infra with reference to FIG. 4.

The conference data management apparatus 103 includes an overlay engine unit 103a, a keyword extraction unit 103b and a participant application unit 130c.

The overlay engine unit 103a of the conference data management apparatus 103 associates a presentation document with overlay data. The overlay data, which is received by the conference data management apparatus 103 from the user terminal 101, includes annotations made by the user of the user terminal 101 on the presentation document of the conference. The overlay annotations may include underlining, highlighting or circling of words or phrases or handwritten or typed comments on various locations (e.g. in the margins) of the presentation document. Such overlay data received from the user terminal 101 is associated with the conference (e.g. by using a unique ID assigned to the conference) in a meeting database (e.g. the database 104). As shown in the example of FIG. 9 ("overlay annotation file information"), the file ID, meeting ID and file URL may be stored in a table to keep track of which overlay data belongs to which conference.

The keyword extraction unit 103b of the conference data management apparatus 103 recognizes keywords in the received overlay data.

Conventional edge detection methods may be used to extract overlay annotations from the overlay data. For example, the keyword extraction unit 103b of the conference data management apparatus may select a pixel from the image portion of the overlay data and sequentially compare the brightness of neighboring pixels, proceeding outward from the selected pixel. In doing so, if a particular adjacent pixel has a brightness value that is significantly greater or less than the selected pixel (e.g. exceeding a threshold value), the adjacent pixel may be determined to be an edge pixel delimiting an overlay object. Once all of such edge pixels are determined, the overlay object can be recognized. Such a process can be repeated until the keyword extraction unit 103b has examined all the pixels in the image portion of the overlay data to extract one or more overlay objects from the overlay data received via the meeting participation application. However, the algorithm used by the keyword extraction unit 103b is not limited to the one discussed above, and any well-known detection methods not discussed herein (e.g. Canny algorithm) may be used to extract overlay objects from the overlay data.

In the case of overlay data including non-graphical items such as a voice note, conventional speech recognition methods may be used to extract words or phrases from such portion of the overlay data. Such speech recognition methods may be based on any conventional algorithm, such as Hidden Markov Models, dynamic time warping or neural networks. Such algorithms are well known in the art and for the sake of brevity, not discussed here.

Once all the overlay objects in the received overlay data are recognized, such overlay objects may be used to identify keywords to be associated with the specific presentation.

For example, if the extracted overlay object is a circle (e.g. any kind of closed loop), the keyword extraction unit 103b may recognize the word or phrase enclosed by the circle as keywords. If the extracted overlay object is in the shape of an underline, the keyword extraction unit 103b may recognize the word or phrase located on top of such underline as keywords. If the extracted overlay object includes a string of recognizable characters (e.g. a comment written by a participant in the margin), the keyword extraction unit 103b may recognize the string of characters as keywords. In recognizing words or phrases as keywords, the keyword extraction unit 103b may filter such words or phrases such that only meaningful or informative words or phrases are recognized as keywords. For example, if the keyword extraction unit 103b detects a phrase "Great point!" in the margin of a presentation slide, such phrase may not be recognized as keywords with which the conference may be associated in the meeting database, since such phrase does not provide any useful information. However, such a phrase may still be monitored to collect information about the conference (e.g. to assess participant feedback or satisfaction). On the other hand, if the recognized phrase is "Compare with iPad" for example, the keyword extraction unit 103b may recognize the word "iPad" as a keyword and store the keyword in the meeting database in association with the conference. An example of such meeting database is shown in FIG. 9 ("keyword information").

Figure 13:
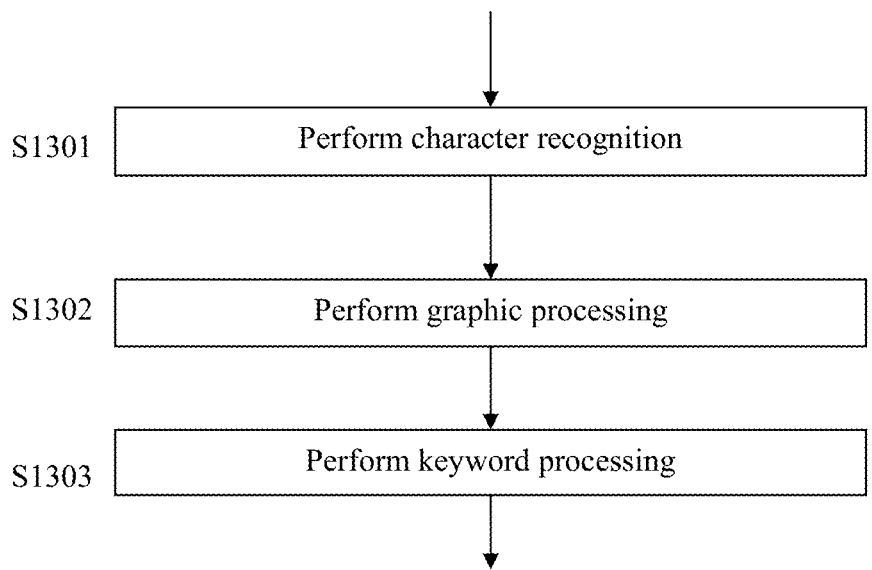
FIG. 13 shows a flowchart for a method of recognizing keywords in overlay data, according to an exemplary embodiment.

The operation of the keyword extraction unit 103b is further described infra in connection with the example shown in FIG. 13.

The participant application unit 103c of the conference data management apparatus 103 provides a meeting participation application to the user terminal 101.

The meeting participation application 107 includes a registration UI 107a, a participant authentication unit 107b and a presentation UI 107c.

The registration UI 107a of the meeting participation application 107 allows a user to register for a specific meeting. For example, the registration UI 107a presents to the user, via the user terminal 101, a list of conferences and allows the user to select a particular conference he or she wishes to attend. The list of conferences may be based on whether a particular conference is currently accepting participant registration. For example, the user may only see a list of conferences that are currently accepting participant registration at the moment the user wishes to register for a conference. In another exemplary embodiment, users may be able to register for past or future conferences to retrieve the presentation files related to such conferences.

Once a particular conference is selected by the user, a user request to join the particular conference is sent to the participant authentication unit 107b of the meeting participation application 107, and the participant authentication unit 107b authenticates the user request to join the conference based on, for example, user credentials submitted by the user. However, in a case that the particular conference is public and open to anyone, such login credentials may not be required.

A user may have to be authenticated before he or she can successfully register for a conference and thus be able to participate in the conference and access the presentation files related to the conference may depend on the login credentials supplied by the user.

For example, the participant authentication part 107b may maintain user authentication information for each conference, and when the participant authentication part 107b receives a user request to participate in a specific conference, the participant authentication part 107b requests user credentials from the requesting user. If the user credentials provided by the requesting user match one of the entries in the user authentication information maintained for the specific meeting, the user request to participate in the specific meeting is authenticated and the requesting user becomes authorized to participate in the specific meeting. In addition, other verification methods such as one or more biometrics means such as comparing pre-stored fingerprints, palm prints, voice or speech, retinas or irises, facial expressions or features, signature and etc. can be used.

The presentation UI 107c of the meeting participation application 107 provides a presentation UI and multi-layer presentation data to the user terminal 101.

The presentation UI 107c may allow the user to take notes and make annotations, for example, on the touch-sensitive display of the terminal 101. The display of the terminal 101, for example, displays the presentation file (e.g. PowerPoint slides) and overlay annotations are made directly on the display.

The presentation UI 107c may also allow the participant to specify who (or what) access the overlay data representing the annotations made by the participant. For example, the presenter UI 107c may display several access options (i.e. levels of access, including, for example, private, public, presenter only, same department only, etc.) to the user and ask the user to select one of the access options. Alternatively, the presenter UI 107c may allow the user to select from a list of all participants of the meeting (e.g. "select who may access your overlay annotations").

In addition, the presentation UI 107c may allow the user to add an active link to a content source to the overlay data. For example, the presentation UI 107c may include a button for adding an active link, and by activating the button, the user is allowed to submit an active link pointing to other content. The submitted link is then added to the overlay data.

Figure 5:
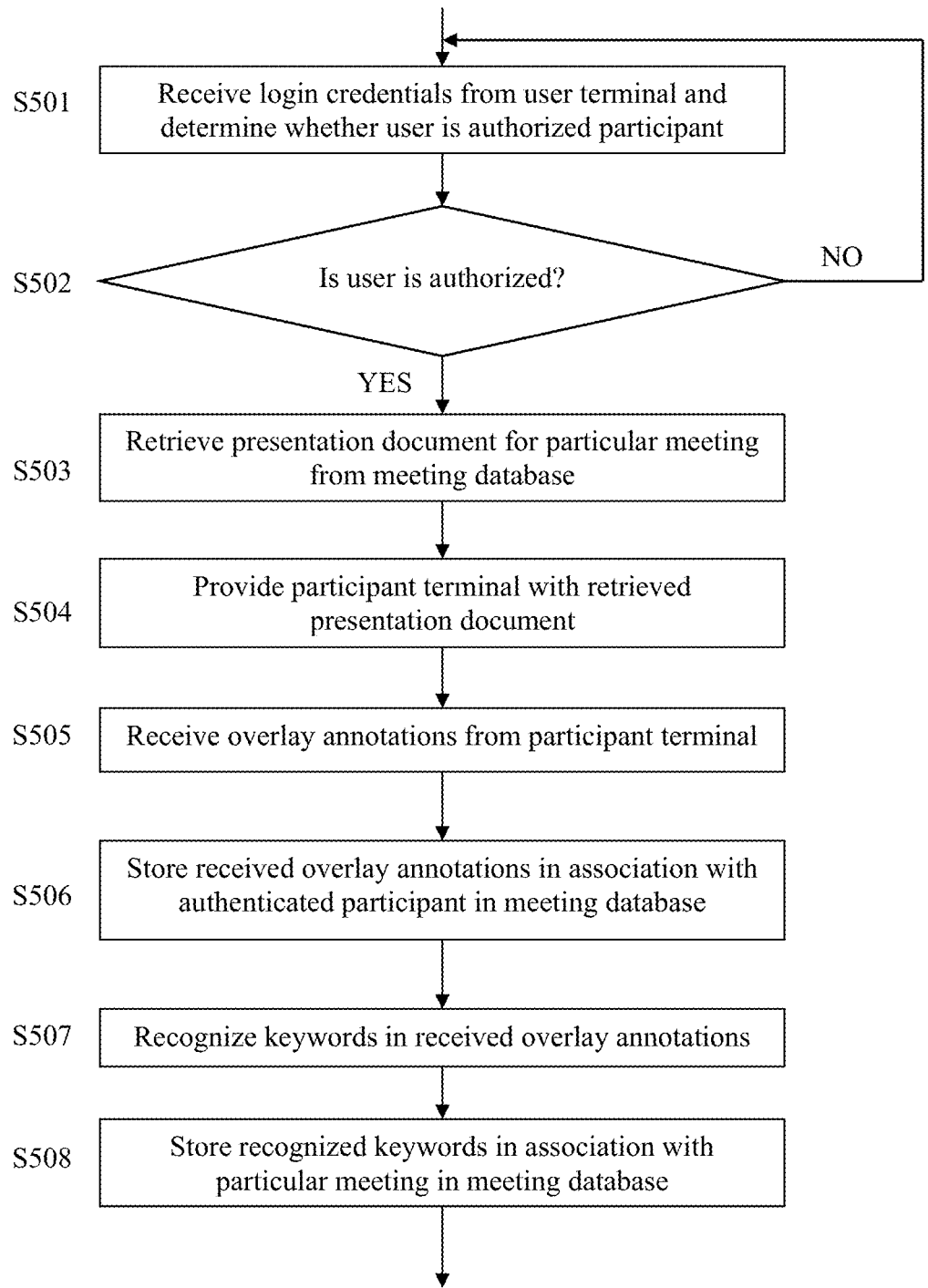
FIG. 5 shows a flowchart for a method of managing conference data, according to an exemplary embodiment.

The operation of the conference data management apparatus 103 is further described infra in connection with the example of FIG. 5. The steps described above as being performed by the conference data management apparatus 103 (e.g. keyword extraction) are not limited to being performed on such apparatus connected to user terminals via the network 106, and all or part of such steps described above may be performed at terminal-side, e.g., at the terminals 101 and 102.

The database 104 includes meeting data corresponding to a plurality of meetings. The meeting data for each meeting may include one or more presentation documents presented at the meeting, a set of overlay data created and/or edited by a plurality of participants of the meeting, and a set of keyword data associating the keywords extracted from the overlay data with the meeting. Although only one set of meeting data (i.e. meeting #1 104a) is shown in FIG. 1A, it should be understood that the database 104 may include plural sets of meeting data corresponding to plural meetings whose data is managed by the conference data management apparatus 103.

In an exemplary embodiment, the database 104 may be an Intranet folder, locally connected to the other devices of the system 100 via the network 106. In another exemplary embodiment, the database 104 may be connected to the conference data management apparatus 103 via the Internet.

The content sources 105 can provide various contents, and includes specific contents of interest to the user as annotated by the user in the overlay. As a result of the user annotation, the over lay may include links or pointers to the specific content or content sources of interest. The content sources 105 may be a local storage or a storage connected via a network (e.g. the Internet), or a combination of both.

The network 106 can be a local area network, a wide area network or any type of network such as an intranet, an extranet (for example, to provide controlled access to external users, for example through the Internet), the Internet, etc., or a combination thereof. Further, other communications links (such as a virtual private network, a wireless link, etc.) may be used as well for the network 106. In addition, the network 106 preferably uses TCP/IP (Transmission Control Protocol/Internet Protocol), but other protocols can also be used. How devices can connect to and communicate over the network 106 is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

With reference to FIG. 1B, a system 110 according to another exemplary embodiment is described below.

The system 110 includes a participant terminal 111, a conference data management apparatus 113, a database 114 and content sources 115, communicating via a network 116.

The UI providing unit 113c of the conference data management apparatus 113 provides to the participant terminal 111 (i) presentation data and (ii) presentation UI, which includes an annotation part, an access control part, and a link adding part.

The annotation part allows the user to take notes and make annotations, for example, on the touch-sensitive display of the participant terminal 111. The display of the terminal 111, for example, displays the presentation file (e.g. PowerPoint slides) and overlay annotations are made directly on the display.

The access control part allows the participant to specify access for the overlay data provided by him or her. For example, the presentation UI may display several access options (i.e. levels of access, including, for example, private, public, presenter only, same department only, etc.) to the user and ask the user to select one of the access options. Alternatively, the presentation UI may allow the user to select from a list of all participants of the meeting (e.g. "select who may access your overlay annotations").

The link adding part allows the user to add an active link to a content source to the overlay data. For example, the presentation UI may include a button for adding an active link, and by activating the button, the user is allowed to submit an active link pointing to other content. The submitted link is then added to the overlay data.

As illustrated in FIG. 1B, the participant terminal 111 provides a participation request, overlay annotations, access information and active links to the conference data management apparatus 113 via the network 116.

Otherwise, the operations of the system 110 are similar to those described in connection with the system 100 of FIG. 1.

It should be appreciated that FIGS. 1A and 1B mere illustrate exemplary embodiments of a system according to the present disclosure and that the processing in the system according to the present disclosure can be distributed across the network or focused at one side of the network, as circumstances or need warrants. For example, although each of the overlay engine unit 103a, keyword extraction unit 103b and participant application unit 103c is shown in FIG. 1A as being integrated in the conference data management apparatus 103, the participant application unit 103c may be separately provided, such as, for example, as an application server to provided the meeting participation application. As another example, although the meeting participation application can be provided largely as a user interface, said application can optionally include processing portions (such as, for example, keyword extraction) as well.

With reference to FIG. 2, a database 201 which can be a meeting database or a structure encompassing all or a portion of a meeting database, according to another exemplary embodiment, is described below. FIG. 2 shows a block diagram illustrating contents of the database 201. In the example of FIG. 2, the database 201 includes a patent meeting 201a, a software development meeting 201b, a faculty meeting 201c and a game developers conference 201d.

The patent meeting 201a includes keywords 201a-1, minutes 201a-2, a presentation 201a-3, attorney's notes 201a-4, client's notes 201a-5 and external documents 201b-6. The keywords 201a-1 may be keywords extracted from overlay annotations provided to the conference data management apparatus 103 of FIG. 1A.

The attorney's notes 201a-4 and client's notes 201a-5 are examples of overlay annotations made by various participants of the patent meeting 201a. As indicated in FIG. 2, access to the attorney's notes 201a-4 and client's notes 201a-5 may be limited or controlled (such as by the conference data management apparatus 103 or by an access control part, not shown, of the database, or by another part), the extent of access configurable by the attorney and the client, respectively.

The external documents 201b-6 may be, for example, PDF files of references cited in an Office Action. Rather than including the entire references in the presentation file, the presenter may have simply added active links pointing to such references, and the conference data management apparatus 113 of FIG. 1B, for example, has archived the external content from the content source identified by the active links. Similarly, in the software development meeting, a programmer may have included links to numerous code files stored in the company network, and such code files are archived as internal documents 201b-6.

Although not shown in FIG. 2, the faculty meeting 201c and game developers conference 201d may have similar structures as discussed above.

Figure 3:
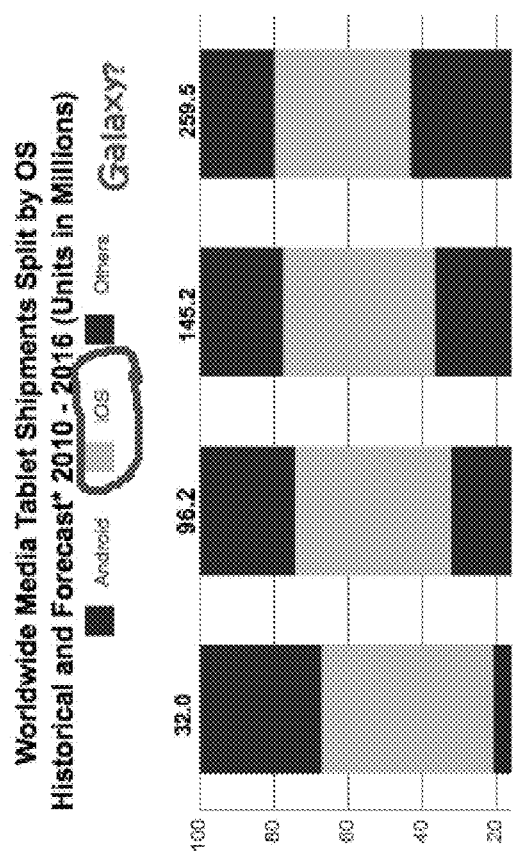
FIG. 3 shows sample overlay annotations on a presentation document in an exemplary embodiment.

An example of a presentation document with overlay annotations displayed to a participant of a conference is shown in FIG. 3. In the example of FIG. 3, the participant (e.g. attendee or presenter) has underlined the words "Cheap Kindle Fire", circled "iOS" in the legend, and written "Galaxy?" next to the legend. For example, if the particular terminal device used by the participant is equipped with a touch-sensitive display, the underlining and circling of words or phrases may be done by hand (i.e. using fingers) or done using any type of computer accessories (e.g. a stylus)

designed to assist with touch-sensitive displays. The meeting participation application provided to the terminal device may include a set of tools for facilitating the user annotation process. For example, the participant may tap a word in the presentation file to highlight or underline the word, and double tap a location on the screen to be able to type comments at the location. Alternatively, other input devices (e.g. a computer mouse) may be used to highlight, underline, circle or otherwise add graphical overlay annotations to the presentation file. The participant may also add comments directly on the touch-sensitive display, for example, by hand or using a computer accessory such as a stylus, or type them out using a keyboard (including a graphical keyboard that may be displayed on the touch-sensitive display). The participant may even talk into a microphone attached to the terminal device to add a voice note to the presentation file.

The input method used to create and add overlay annotations to the presentation document is not limited to the methods discussed supra, and may include other equivalent methods of inputting data into a terminal device.

Figure 4:
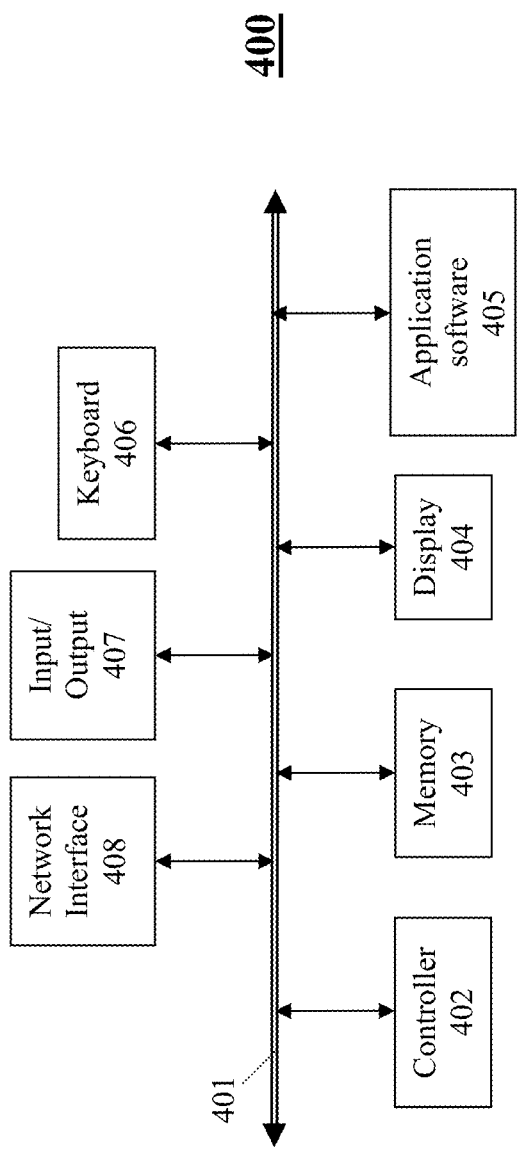
FIG. 4 shows a block diagram of a user terminal, according to an exemplary embodiment.

An example of a configuration of the terminals 101 and 102 of FIG. 1A is shown schematically in FIG. 4. In FIG. 4, terminal device 400 includes a controller (or central processing unit) 402 that communicates with a number of other components, including memory 403, display 404, application software 405, keyboard (and/or keypad) 406, other input/output (such as mouse, touchpad, stylus, microphone and/or speaker with voice/speech interface and/or recognition software, etc.) 407 and network interface 408, by way of an internal bus 401.

The memory 403 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 408 provides a means for connecting (for example, by way of an Ethernet connection or other network connection which supports any desired network protocol such as, but not limited to TCP/IP, IPX, IPX/SPX, or NetBEUI) to network 401.

Application software 405 is shown as a component connected to the internal bus 401, but in practice is typically stored in storage media such as a hard disk or portable media, and/or received through the network 105, and loaded into memory 403 as the need arises.

Depending on the type of the particular terminal device, one or more of the components shown in FIG. 4 may be missing or connected externally. For example, a particular mobile device may be missing the keyboard 406, but another keyboard may be connected to the mobile device externally. Similarly, a particular desktop computer may, for example, have an external microphone connected thereto.

Additional aspects or components of the terminal device 400 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

With reference to FIG. 5, a method for managing conference data through a network (utilized by, for example, the conference data management apparatus 103 of FIG. 1A) is described below.

In the example shown in FIG. 5, the participant authentication part 103b of the conference data management apparatus 103 receives login credentials from the user terminal 101 and uses the login credentials to authenticate the user request to join a specific conference (step S501). Although not shown in FIG. 5, the user may be required to first register for the specific conference. For example, the registration may take place in advance before the scheduled date/time of the conference (e.g. providing registration information for an upcoming conference, and then at the conference, logging in via the meeting participation application provided by the conference data management system to be authenticated as a registered participant). Alternatively, the conference data management may maintain an independent list of authorized participants who may participate in the conference, and authenticate users who submit a request to participate in the conference, based on the list of authorized participants.

Once the user request to join the conference is authenticated (S502, YES), the conference data management apparatus 103 retrieves a presentation document for the specific conference from the meeting database 104 (step S503). The presentation document can include PowerPoint presentation slides or any other documents or image data. This can be achieved, for example, by looking up the specific conference (e.g. by using a unique ID assigned to the specific conference) in a table associating each conference with one or more presentation files used for the conference.

The conference data management apparatus 103 provides the user terminal 101 with the retrieved presentation document (step S504). For example, in a case that the user terminal 101 is a tablet PC, the user can simply open the presentation file provided by the conference data management apparatus 103 and scroll through the pages of the presentation file on the tablet PC, and take notes and make annotations directly on the touch-sensitive display of the tablet PC.

Once the user makes overlay annotations on the presentation document, the conference data management apparatus 103 receives overlay data containing the overlay annotations made by the user from the user terminal 101 (step S505) and stores the received overlay annotations in association with the presentation file in the database 104 (step S506). For example, the overlay data (e.g. a PDF file including all the annotations made by the user) and the corresponding presentation file are tracked in a table such as shown in FIG. 9 ("overlay data information").

Then, the keyword extraction part 103b of the conference data management apparatus 103 recognizes one or more keywords from the received overlay data (step S507). The keyword recognition process is further described infra with reference to FIG. 13.

The recognized keywords are stored in the database 104 in association with the specific conference of which the user was a participant and for which the user made notes and/or annotations. For example, each conference for which there are one or more sets of overlay data containing keywords is tagged with such keywords found in the overlay data for the conference. As shown in FIG. 9 ("keyword information"), each conference (here, identified by a unique meeting ID) has a plurality of keywords which potentially describe the content of the conference (e.g. what the participants thought was important or interesting). Thus, each conference is tagged with keywords that identify what its participants thought were important or worth noting.

Figure 6:
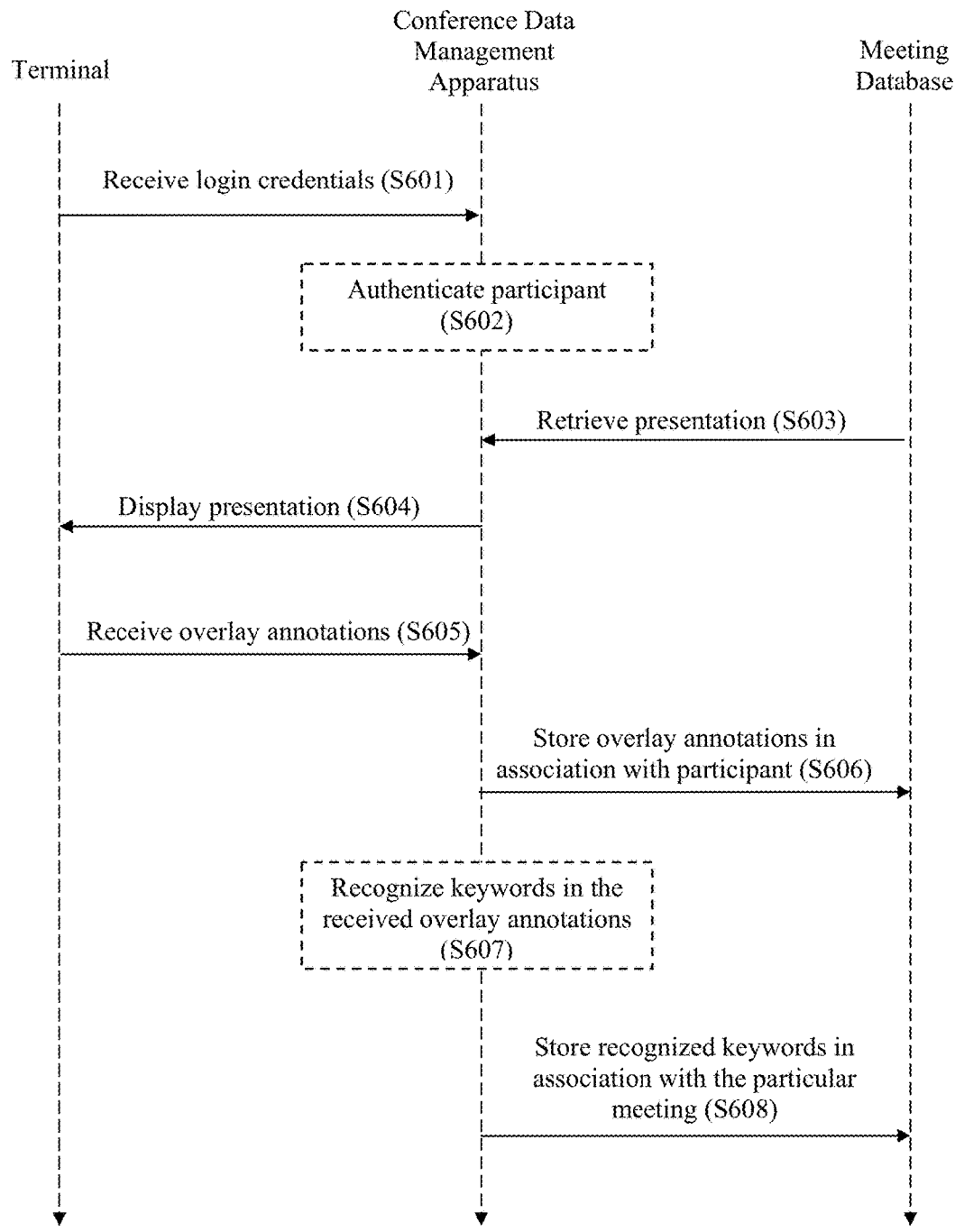
FIG. 6 shows a dataflow in a conference data management system, according to an exemplary embodiment.

FIG. 6 shows a dataflow corresponding to the steps illustrated in FIG. 5, according to an exemplary embodiment. For the sake of simplicity, the steps are described as they are performed by the conference data management apparatus 103.

In the example of FIG. 6, the conference data management apparatus 103 receives the login credentials from the user terminal 101 (step S601). Upon successfully authenticating the user as an authorized participant of the conference that the user requested to join (step S602), the conference data management apparatus 103 retrieves the presentation file associated with the specific conference from the meeting database (step S603) and displays the presentation file to the user terminal 101 (step S604). The user then makes overlay annotations on the presentation file, and the conference data management apparatus 103 receives overlay data containing such overlay annotations from the user terminal 101 and stores the overlay data in association with the user and the specific conference in the meeting database (step S606). Then, the conference data management apparatus 103 recognizes (e.g. in the manner described with reference to FIG. 13) keywords in the received overlay data (step S607) and stores the recognized keywords in association with the specific conference in the meeting database (step S608).

Figure 7:
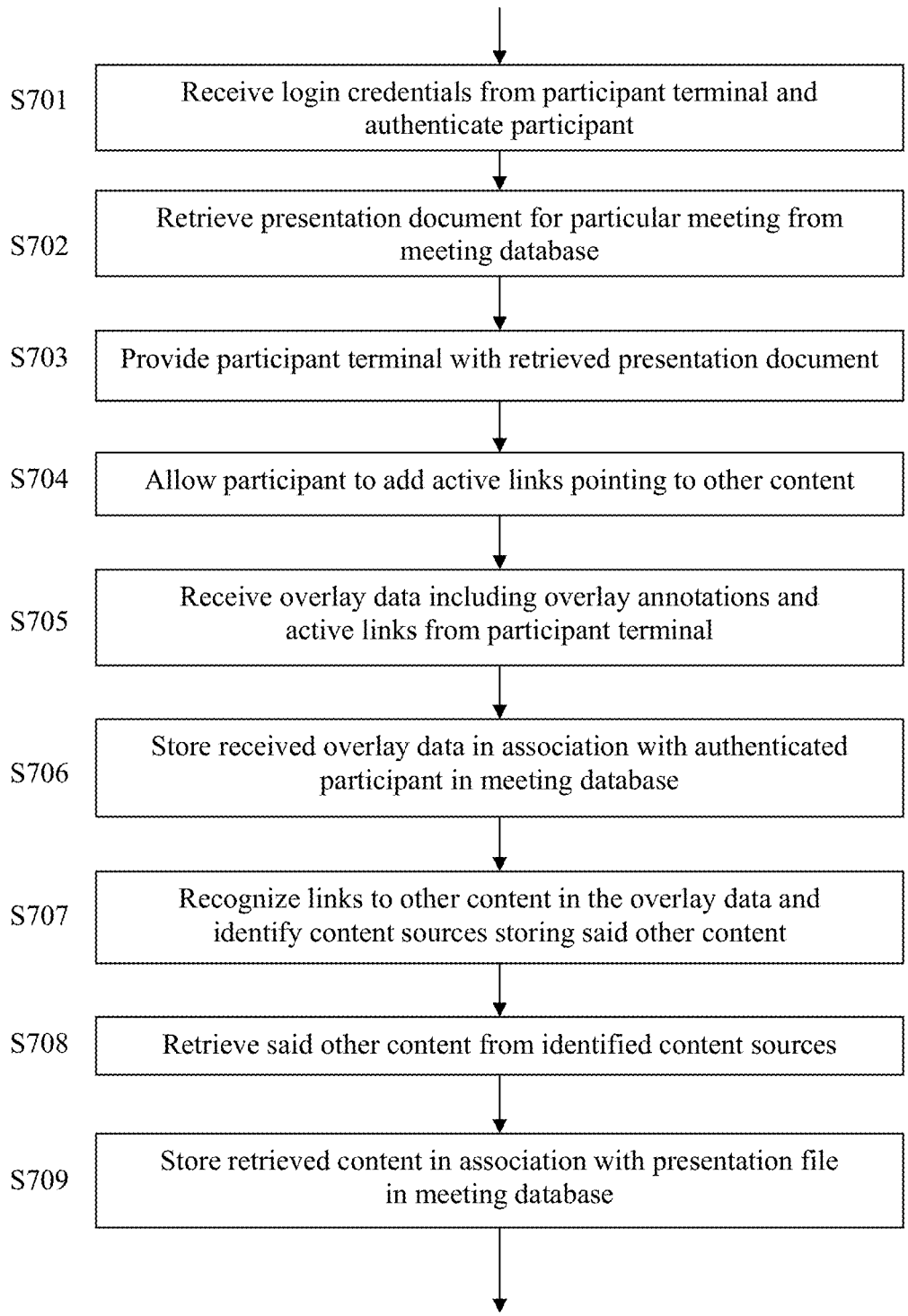
FIG. 7 shows a flowchart for a method of managing conference data, according to an exemplary embodiment.

With reference to FIG. 7, another method for managing conference data through a network (utilized by, for example, the conference data management apparatus 113 of FIG. 1B) is described below.

In the example shown in FIG. 7, steps S701-703 are similar to the steps s501-s504 described in connection with the example of FIG. 5. In step S704, the conference data management apparatus 113 allows the participant at the terminal 111 to add active links pointing to other content to the overlay data (i.e. along with annotations). The conference data management apparatus 113 then receives the overlay data including the participant's annotations and any added active links from the terminal 111 (step S705) and stores the received overlay data in association with the participant in the meeting database (step S706). The conference data management apparatus 113 then recognizes the active links added to the overlay data by the participant and identifies content sources from which the other content to which the active links point can be retrieved (step S707). For example, the content sources may include a web storage accessible via the Internet or a network storage accessible via a local network.

Once the content sources have been identified, the conference data management apparatus 113 retrieves said other contents from the identified content sources (step S708) and stores the retrieved content in association with the presentation file in the meeting database. Thus, according to the method shown in FIG. 7, linked content (i.e. external to the presentation file itself) is made locally available such that such content can be accessed at a later time without having to worry about whether the content external to the presentation file still exists at the time of viewing the presentation file.

The conference data management apparatus 113 may also retrieve and store contents linked by the author of the presentation, and not just those linked by the author of the overlay data.

Figure 8:
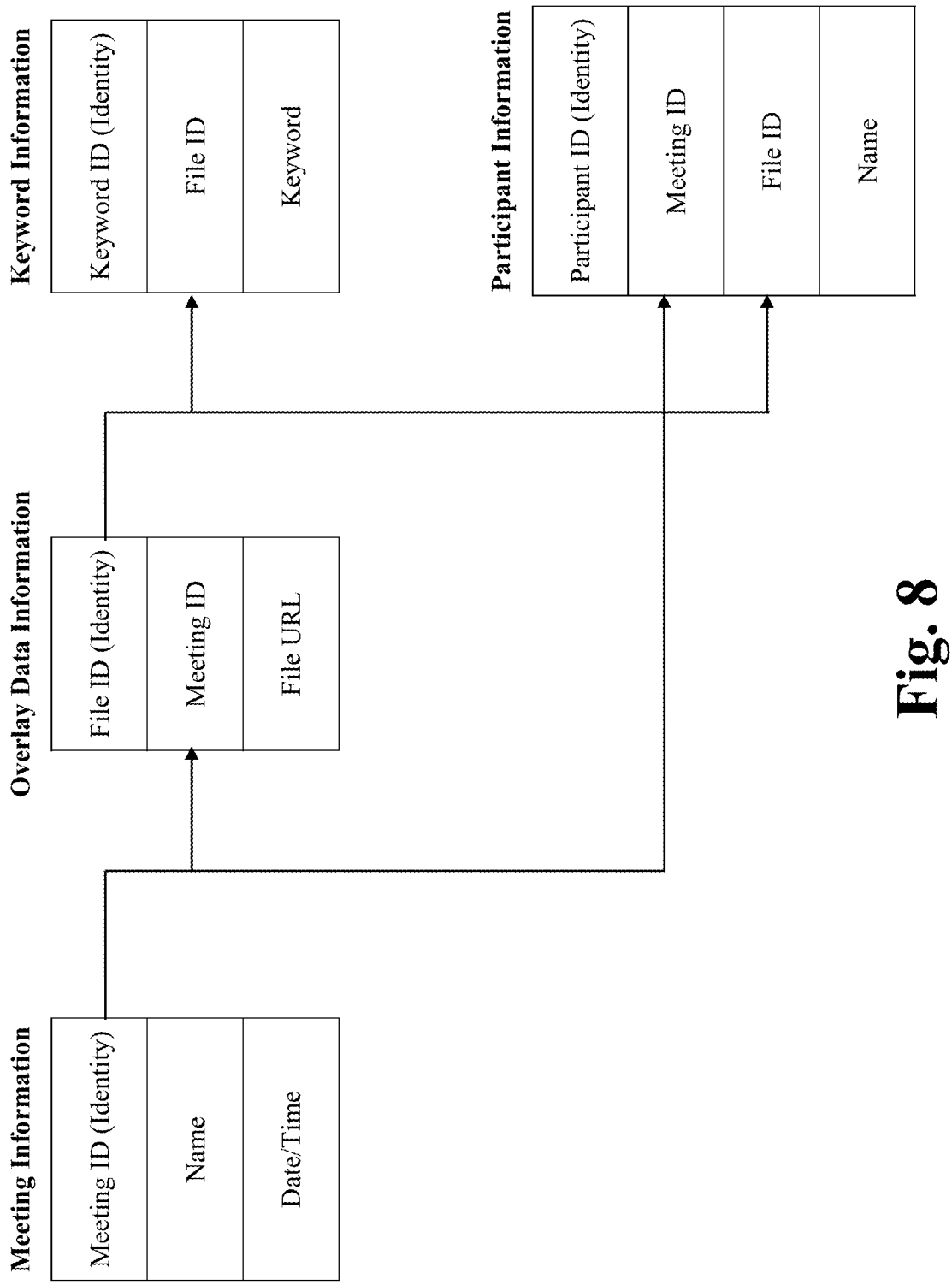
FIG. 8 shows a sample structure of tables stored in a meeting database in an exemplary embodiment.

FIG. 8 shows a sample structure of tables stored in a meeting database in an exemplary embodiment. FIG. 9 shows tables stored in the meeting database in an exemplary embodiment, tables corresponding to the structure shown in FIG. 8.

In the examples of FIGS. 8 and 9, meeting information, overlay data information, keyword information and participant information are shown.

The meeting information keeps track of, for each meeting, (i) a meeting ID uniquely assigned to each meeting, (ii) the name of the meeting, and (ii) the date and time of the meeting.

The overlay data information keeps track of, for each overlay data, (i) a file ID uniquely assigned to each overlay data, (ii) the meeting ID associated with the overlay data, and (iii) the file URL where the overlay data is stored (e.g. in the meeting database 104).

The participant information keeps track of, for each participant, (i) a participant ID uniquely assigned to each participant, (ii) the meeting ID of the meeting in which the participant is participating and (iii) the name of the participant.

The keyword information keeps track of, for each keyword extracted from one or more sets of overlay data, (i) a keyword ID uniquely assigned to each keyword, (ii) the meeting ID of the meeting with which the keyword is to be associated and (iii) the keyword itself.

As another example of what may be stored in the meeting database (e.g. the database 104), FIG. 10 shows overlay data and author information, which associates each overlay data stored in the meeting database with the author of the overlay data (i.e. the participant who made the overlay annotations stored as the overlay data). Such information may be used, for example, to determine whether a user has access to a particular overlay data file (e.g. if the user ID of the user matches the author ID, the user is authenticated).

Another example of what may be stored in the meeting database (e.g. the database 104) is shown in FIG. 11. As shown in FIG. 11, overlay data access information keeps track of, for each overlay data stored in the meeting database, access information (e.g. configured by the author) of the overlay data. For example, the overlay data having a file ID of 1 has an access type of "public". Such access type may indicate that the overlay data is accessibly by anyone. In contrast, the overlay data having a file ID of 2 has an access type of "private" which may indicate that only the author of the overlay data may access the overlay data. In addition, other access types such as "presenter only", "admin only" and "same department only" shown in FIG. 11 may be used to indicate who may access the overlay data. The overlay data access information may also specify individual users or participants who are authorized to access the overlay data (e.g. any user with a user ID of 1, 3 or 5).

For example, whether a particular user has a certain status (e.g. presenter, admin or same department as the author) may be determined by accessing the participation information stored in the meeting database. The participation information may indicate whether a participant is a presenter at any of the meetings or an administrator, or to which department the participant belongs.

FIG. 12 shows saved content information stored in the meeting database according to an exemplary embodiment. The saved content information shown in FIG. 12, holds information about a plurality of content sources added to the overlay data of various meetings, along with the locations where the content retrieved from the plurality of content sources are stored.

As discussed in connection with FIG. 7, a participant may add an active link to a content source to a particular presentation, and when the conference data management apparatus receives such request, the active link to the content source is added to the overlay data of the particular presentation.

For example, in the table shown in FIG. 12, each of the rows is registered using (i) a unique file ID assigned to each content (i.e. file), (ii) a meeting ID corresponding to the particular meeting corresponding to the overlay data to which the active link to the content is added, (iii) the source location of the content, (iv) the location in which the content downloaded from the content source is stored, and (v) the time at which the archival took place (i.e. time of download).

With reference to FIG. 13, a method for recognizing a keyword in a specific overlay data according to an exemplary embodiment is described.

For example, the keyword extraction part 103b of the conference data management apparatus 103 performs character recognition on the overlay data received from the terminal 101 to obtain a set of recognized characters from the overlay annotations (e.g. comments handwritten by the participant in the margin of the presentation file) created by the participant (step S1301). Any convention character recognition technologies may be used.

Then, the keyword extraction part 103b performs graphic processing on the overlay data to extract any graphical mark that is present in the overlay data, such as underlining, circling, highlighting and etc. (step S1302). As discussed in connection with the system 100 shown in FIG. 1, the graphical marks may be used to recognize additional keywords marked by the participant in the presentation file. For example, character recognition may be performed again on the presentation file to recognize characters delimited by the extracted graphical marks.

The keyword extraction part 103b then associates the recognized keywords with the specific meeting in the meeting database. An example of such association is shown in FIG. 9 ("keyword information").

The above-mentioned embodiments and examples are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A conference data management apparatus for managing meeting data, including a presentation document, corresponding to a specific meeting, the conference data management apparatus comprising:
an overlay engine part that associates, in a meeting database, the presentation document and sets of overlay data, associated via a unique conference ID with the specific meeting; and
a participant application part that provides a presentation user interface and presentation data through a network to a participant terminal, in response to a request from the participant terminal to participate in the specific meeting,
wherein the presentation data includes the presentation document and a set of overlay data,
wherein the participant application part adds user input received through the presentation user interface to the set of overlay data,
wherein the user input received through the presentation user interface and added to the overlay data includes overlay data access information indicating who is authorized to access the set of overlay data,
wherein the sets of overlay data associated with the presentation document, in the meeting database, include (i) a first set of overlay data in which the overlay data access information indicates public access to the first set of overlay data associated with the presentation document, and (ii) a second set of overlay data in which the overlay data access information indicates private access to the second set of overlay data associated with the presentation document, and
wherein upon the apparatus receiving a request from a requestor for a specified set of overlay data, the apparatus determines based on the overlay data access information corresponding to the specified set of overlay data whether the requestor is authorized to access the specified set of overlay data,
wherein the presentation user interface includes a link adding part for the participant to add an active link pointing to other content, specified by the participant through the presentation user interface at a particular moment of time, in association with a specified keyword,
wherein the conference data management apparatus further comprises: a content capture database that archives specified content obtained from a content source through the network; and
a content capture part that retrieves, and archives in said content capture database, said other content specified through the active link, when the participant specifies the other content at the particular moment of time through the presentation user interface, and
wherein said other content archived in said content capture database is the other content obtained by the content capture part at the particular moment of time.

2. The conference data management apparatus of claim 1, wherein the meeting database associates (i) the one or more sets of overlay data and (ii) authors of the respective sets of overlay data.

3. The conference data management apparatus of claim 1, wherein the participant application part provides a meeting participation application through a network,
wherein the meeting participation application includes:
a registration user interface that allows the participant to register for the specific meeting;
a participant authentication part that authenticates a request received through the network from a participant terminal to participate in the specific meeting,
wherein when the request from the participant terminal to participate in the specific meeting is authenticated, the participant application part provides the presentation user interface and the presentation data to the participant terminal.

4. The conference data management apparatus of claim 1, wherein the presentation user interface adds to the overlay data the active link pointing to said other content.

5. A conference application providing apparatus including a processor and a non-transitory computer readable medium tangibly embodying a program of instructions executable by the processor to provide a meeting participation application through a network, said conference application providing apparatus comprising:
a user interface providing part that provides a presentation user interface and presentation data to a participant terminal, in response to a request received through the network from the participant terminal to participate in a specific meeting, the presentation data including a presentation document and a set of overlay data; and an overlay engine part that captures and associates, in a meeting database, the presentation document and sets of overlay data corresponding to respective participants of the specific meeting and associated via a unique conference ID with the specific meeting, and that adds user input received through the presentation user interface to the overlay data, wherein the user input received through the presentation user interface and added to the overlay data includes overlay data access information indicating who is authorized to access the set of overlay data, wherein the presentation user interface provided to the participant terminal includes an access control part for a participant operating the participant terminal to specify whether the overlay data is to be accessible by one or more other participants of the specific meeting, wherein the sets of overlay data associated with the presentation document, in the meeting database, include (i) a first set of overlay data in which the overlay data access information indicates public access to the first set of overlay data associated with the presentation document, and (ii) a second set of overlay data in which the overlay data access information indicates private access to the second set of overlay data associated with the presentation document, and the sets of overlay data associated with the presentation document are provided to, and maintained by, a conference data management apparatus, wherein upon the conference data management apparatus receiving a request from a requestor for a specified set of overlay data, the conference data management apparatus determines based on the overlay data access information corresponding to the specified set of overlay data whether the requestor is authorized to access the specified set of overlay data, wherein the presentation user interface includes a link adding part for the participant to add an active link pointing to other content, specified by the participant through the presentation user interface at a particular moment of time, in association with a specified keyword, wherein the conference data management apparatus archives, in a content capture database, specified content obtained from a content source through the network, and when the participant specifies the other content at the particular moment of time through the presentation user interface, the conference data management retrieves, and archives in said content capture database, said other content specified through the active link, and wherein said other content archived in said content capture database is the other content obtained at the particular moment of time.

6. The conference application providing apparatus of claim 5, wherein the user input includes one or more of (i) writing via a touch-sensitive display of the participant terminal, (ii) writing via user operation of a pointer device to manipulate a pointer device, (iii) textual entry by user operation of a keyboard or graphical keyboard of the participant terminal, and (iv) oral input through a microphone of the participant terminal.

7. A system for managing and archiving meeting data corresponding to a specific meeting including a plurality of participants, the plurality of participants including a presenter associated with a presentation document corresponding to the specific meeting, the system comprising:

a meeting database that captures the meeting data for the specific meeting;

a content capture database; and a conference data management apparatus including a non-transitory computer readable medium tangibly embodying a program of instructions executable by a computer to configure the computer to archive and associate in the meeting database, the presentation document and sets of overlay data capturing annotations of the respective participants of the specific meeting and associated via a unique conference ID with the specific meeting, wherein the overlay data includes overlay data access information indicating, for each set of overlay data, who is authorized to access the set of overlay data, wherein upon the apparatus receiving a request from a requestor for a specified set of overlay data, the apparatus determines based on the overlay data access information corresponding to the specified set of overlay data whether the requestor is authorized to access the specified set of overlay data, wherein the sets of overlay data associated with the presentation document, in the meeting database, includes (i) a first set of overlay data in which the overlay data access information indicates public access to the first set of overlay data associated with the presentation document, and (ii) a second set of overlay data in which the overlay data access information indicates private access to the second set of overlay data associated with the presentation document, and wherein the overlay data image includes an active link to specified content obtained from a content source through the network and archived in said content capture database, wherein the conference data management apparatus further comprises a content capture part that, when the conference data management apparatus receives an active link pointing to other content specified by a participant terminal at a particular moment of time, retrieves, and archives in said content capture database, said other content specified through the active link, and wherein said other content archived in said content capture database is the other content obtained by the content capture part at the particular moment of time.

8. The system of claim 7, wherein the overlay data includes an active link pointing to the content source of the specified content.

9. The system of claim 7, wherein the meeting data archived in the meeting database for the specific meeting includes an active link pointing to a source document for the archived presentation document.

10. The system of claim 7, wherein the conference data management apparatus causes the presentation document and the overlay data to be registered along with meeting minutes of the specific meeting, as the meeting data for the specific meeting in the meeting database.

11. The conference data management apparatus of claim 1, wherein the presentation user interface includes selectable options to specify who is permitted access to the set of overlay data, and the selectable options includes (i) an option to permit public access to the set of overlay data to a requesting terminal that has not participated, in the specific meeting, and (ii) an option to specify private access to one or more registered terminals that participated in the specific meeting as a presenter or as another participant.

12. The conference data management apparatus of claim 1, wherein when the overlay data access information associated with the specified set of overlay data specifies public access, the requestor is permitted to access the specified set of overlay data even if the requestor was not a participant of the specific meeting.

\* \* \* \* \*